United States Patent

[11] 3,613,836

| [72] | Inventor | Frederick Sidney Dowell<br>c/o Fort Dunlop, Erdington, Birmington 24, England |
|---|---|---|
| [21] | Appl. No. | 866,666 |
| [22] | Filed | Oct. 15, 1969 |
| [45] | Patented | Oct. 19, 1971 |
| [32] | Priority | Oct. 15, 1968 |
| [33] | | Great Britain |
| [31] | | 48805/68 |

[54] FRICTION ELEMENT ASSEMBLY SUPPORT AND ACTUATING MEANS FOR DISC BRAKES
9 Claims, 3 Drawing Figs.

| [52] | U.S. Cl.................................................. | 188/71.1, 188/73.1, 188/73.3 |
|---|---|---|
| [51] | Int. Cl................................................... | F16d 55/224 |
| [50] | Field of Search..................................... | 188/71.3, 73.1, 73.2, 73.3, 73.6 |

[56] References Cited
UNITED STATES PATENTS

| 3,260,332 | 7/1966 | Wells............................ | 188/73.6 |
|---|---|---|---|
| 3,447,641 | 6/1969 | Dowell.......................... | 188/73.6 |
| 3,469,658 | 9/1969 | Forsythe....................... | 188/72.3 |

FOREIGN PATENTS

| 1,020,091 | 2/1966 | Great Britain................ | 188/71.4 |

*Primary Examiner*—George E. A. Halvosa
*Attorney*—Jeffers and Young

ABSTRACT: A disc brake in which the friction element assemblies, which are arranged to engage a minor proportion of the disc area, are guided into engagement with the disc on three pairs of guide members, each pair of guide members comprising a key and a corresponding keyway, the members of each pair being arranged to allow sliding movement in an axial brake applying direction and also a limited amount of radial movement relative to the axis of rotation of the disc, so allowing each friction element assembly to align itself in its own plane to compensate for inaccuracies in manufacture, the location of the keys and deformations and expansions occuring during braking, of which the following is a specification.

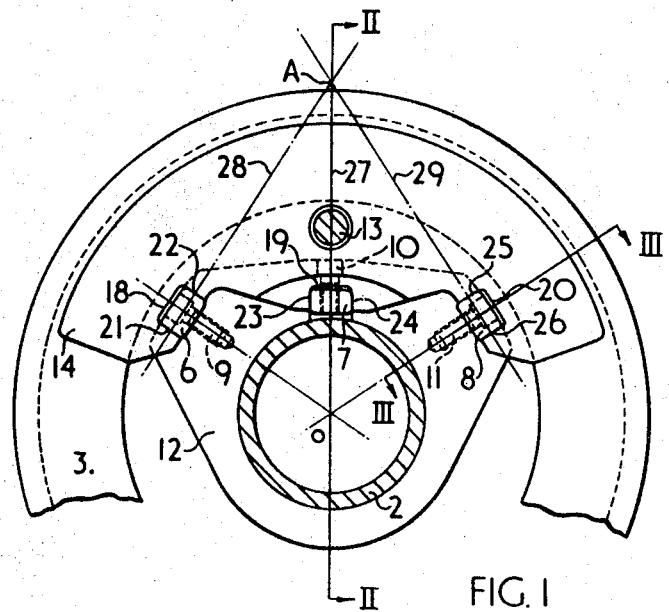
FIG. 1
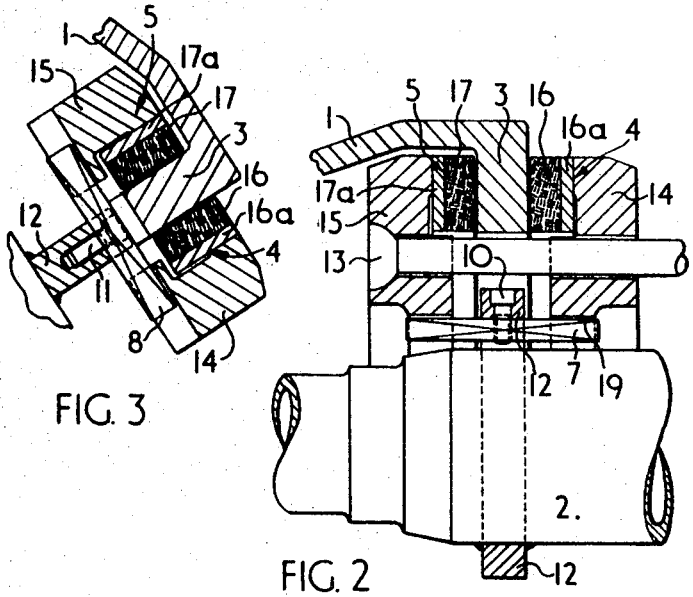
FIG. 3
FIG. 2

FRICTION ELEMENT ASSEMBLY SUPPORT AND ACTUATING MEANS FOR DISC BRAKES

This invention relates to disc brakes.

In a disc brake of the kind having at least one friction element assembly slidable on guides for engagement with a brake disc it is desirable that an easy sliding action should be maintained under all conditions of operation. This is difficult to achieve in practice. Excessive clearances in the guides may cause rattling and possible damage due to impact loading on brake application and a close-sliding fit is difficult to achieve due to the difficulty of ensuring exact machine tolerances. In addition a close fit on the guides may cause the friction element assembly to jam or bind during operation due to differences in the thermal expansion of the friction element assembly and the guides or to distortion of these parts when loaded or to inadequate linearity of the sliding surfaces of the friction element assembly or guides.

One object of the present invention is to provide a guiding means for a friction element in a disc brake which helps to maintain an easy sliding movement of the friction element assembly under all conditions of operation.

According to the invention, a disc brake comprises a rotatable disc, a nonrotatable support, a pair of axially aligned relatively axially movable friction element assemblies disposed one on each side of the disc, a brake-applying mechanism, and guide means associated with the support and with at least one of the friction element assemblies arranged to guide movement of the friction element assembly in a brake-applying direction, said guide means comprising at least three pairs of interengaging guide members, the members of each pair being associated respectively with the support and the friction element, one of the members of each pair constituting a key and the other member of the pair constituting a keyway, the pairs of members being arranged to allow sliding movement of the key relative to the keyway in the axial direction and also a limited amount of radial movement with respect to the axis of rotation of the disc.

One embodiment of the invention will now be described by way of example with reference to the accompanying drawings of which:

FIG. 1 is an axial view of a disc brake in accordance with the present invention;

FIG. 2 is a sectional view as indicated by the line II—II of FIG. 1, and

FIG. 3 is a sectional view as indicated by the line III—III of FIG. 1.

A disc brake comprises a spider 1 arranged to be rigidly secured to a vehicle wheel (not shown) and rotatable therewith about an axle 2. An annular disc 3 is secured at its outer periphery to the spider 1.

A first friction element assembly 4 and a second friction element assembly 5 are mounted on opposite sides of the disc and are axially slidable towards one another on three spaced-apart keys 6, 7 and 8 which are bolted by bolts 9, 10, 11 to a flange 12 welded to the axle and extend parallel to the axis of the disc adjacent its inner periphery.

A brake-applying mechanism comprising a ball-and-ramp expander mechanism (not shown) and a tie rod 13, for transmitting the brake-applying force to the friction element assembly 5 on the side of the disc remote from the applying mechanism, is provided. The brake-applying mechanism draws the two friction element assemblies towards one another to grip the disc and apply a braking force thereto.

The friction element assemblies 4,5 each comprise a pressure plate 14,15 of part-annular form, viewed in the axial direction of the disc, to which friction pads 16,17 and associated backing plates 16a, 17a are detachably secured. The braking force is applied to the friction element assemblies along a line of action which is nonintersecting with the friction pads as readily seen in FIGS. 1 and 3. The three keys 6, 7, 8 are each of rectangular cross section and three keyways 18, 19, 20 in the form of slots are provided on the radially inner edge of the pressure plate of each friction element assembly engaging respectively with the keys and making a close sliding fit therewith.

The Xthree keys are each radially aligned, that is, they are arranged with two sides 21,22; 23,24; 25,26 substantially parallel to a plane passing through the axis of rotation of the disc 3 and the longitudinal axis of the corresponding key 6, 7 and 8.

Each friction element assembly is self-aligning and able to adjust its position on its associated keys in its own plane to compensate for differences between the spacing of the slots and the spacing of the keys arising from inexact machine tolerances in the manufacture of the friction element assembly and the location of the keys, and different thermal expansions of the friction element assembly and the keys during operation. The radial alignment of the slots and keys allows 'dishing' deformation of the friction element assemblies to occur during operation without jamming of the slots and keys since the stresses and deformations imposed by dishing occur in substantially radially aligned planes.

If the separation of the slots is slightly greater than the separation of the corresponding keys the friction element assembly will align itself on the keys at a position slightly radially outward of its intended position.

Thus if the machining tolerances in the spacing of the keys and slots are inaccurate the friction element assembly will still make a close sliding fit with the keys and if the separation of the slots increases during operation the plate will slide on the keys radially outwardly to a position at which it once again makes a close sliding fit.

Since the plate is capable of movement in its own plane on the keys it is important that at least three keys, not sharing a common instantaneous center of rotation, should be provided. With only two radially aligned keys it could be possible for the plate to pivot about their common instantaneous center and disengage one of the slots from its key. The provision of a third key, not sharing a common instantaneous center of rotation, prevents this.

One of the slots, the slot 19, is arranged centrally on the pressure plate, that is on the axis of symmetry of the plate considered in the axial direction, and the other two slots 18,20 are arranged one on each side of the central slot 19 and at equal distances therefrom.

The two outer slots 18,20 are also arranged so that the lines of action 28,29 of the reaction forces exerted on the keys 6,8 engaging these slots intersect at a point A, their instantaneous center of rotation, which is arranged to coincide with the shear center of the friction element assembly. The "shear center" is the point on the axis of symmetry of the element assembly at which the resultant drag forces acting on the friction pad during braking can be balanced by a single reaction force, without placing any torsional loads on the assembly.

With this arrangement, of coincident instantaneous center and shear center the resultant of the shear forces acting on the friction element assembly during braking has no moment about the instantaneous center and hence there is no reaction force acting on the central key, due to the tendency of the friction element assembly to rotate, and the central key acts merely as a stabilizing support.

The slots 18, 20 may alternatively be arranged so that their instantaneous center lies at a point further from the axis of the disc than the shear center of the friction element assembly. With this arrangement a reaction force is exerted on the central key which acts in the same direction as the direction of action of the resultant of the reaction forces acting on the two outer keys. Since the sum of the reaction forces acting on the three keys must be maintained equal to the resultant of the shear force acting on the friction element assembly, any increase in the reaction force acting on the center key leads to a proportionate reduction in the forces acting on the two outer keys.

The above arrangements minimize stresses on the keys and sliding friction of the keys in the slots. If however the instantaneous center of the two outer keys lies at a point which is nearer to the axis of the disc than the shear center of the friction element assembly the reaction force on the central key will act in an opposite direction to the resultant force and the forces on the two outer keys will be proportionally increased.

What I claim is:

1. In a disc brake having a rotatable disc: a nonrotatable support, a pair of axially aligned relatively axially movable friction element assemblies of arcuate form disposed one on each side of said disc and having friction pads arranged to engage a minor portion of the disc area, and a brake-applying mechanism arranged to apply a brake-applying force against said friction element assemblies along a line of action which is nonintersecting with said friction pads guide means associated with said support and with at least one of said friction assemblies and arranged to provide guided movement of said friction element assembly in a brake-applying direction and to provide resistance to the braking dragloads thereon, said guide means comprising three pairs of interengaging guide members having uncommon instantaneous centers of rotation, members of each pair being associated respectively with said support and a respective one of said friction elements, one of the members of each pair constituting a key, the other member of the said pair constituting a companion keyway, two sides of each such keyway being disposed substantially parallel to a plane passing through the axis of rotation of said disc and the longitudinal axis of said corresponding key, the pairs of said members being disposed to provide sliding movement of the key within the cooperative companion keyway in an axial direction and also providing limited radial movement with respect to the axis of rotation of said disc.

2. A disc brake according to claim 1 wherein the guide members of each friction element assembly comprise axially extending keyways and the corresponding guide members on the support comprise axially extending keys.

3. A disc brake according to claim 1 wherein each friction element assembly comprises a pressure plate of part annular form, viewed in the axial direction of the disc, to which a friction pad assembly, comprising the friction pad and an associated backing plate, is detachably secured.

4. A disc brake according to claim 1 wherein the keys are bolted to a flange secured to the associated axle.

5. A disc brake according to claim 1 wherein the disc is of annular form secured at its outer periphery to a rotatable support.

6. A disc brake according to claim 1 wherein the keyways are formed on the radially inner edge of each friction element assembly.

7. A disc brake according to claim 6 wherein one of the keyways is arranged centrally on the axis of symmetry of each friction element assembly, considered in the axial direction, and two other keyways are arranged one on each side of the central keyway and at equal distances therefrom.

8. A disc brake according to claim 7 wherein the common instantaneous center of the two outer keyways is arranged to coincide with the shear center of each friction element assembly.

9. A disc brake according to claim 7 wherein the common instantaneous center of the two outer keyways is arranged to lie at a greater distance from the axis of the disc than the shear center of each friction element assembly.